Nov. 1, 1938. R. RIESER 2,134,892
INTERLOCKING FASTENER
Filed May 8, 1935
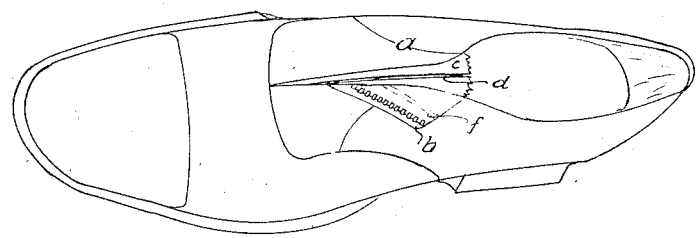
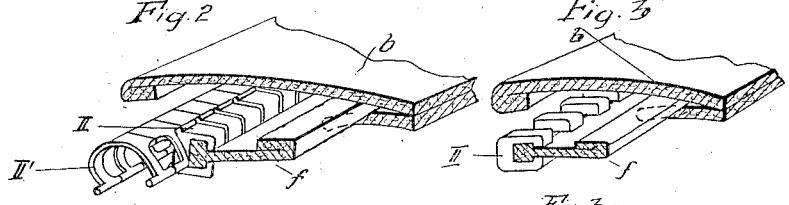
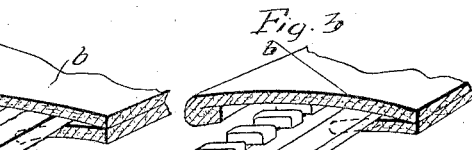
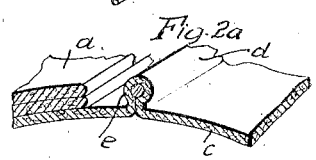 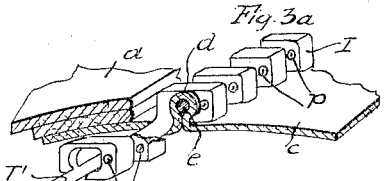
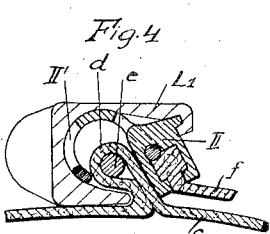 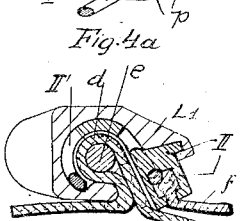 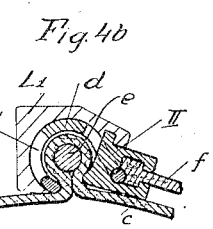
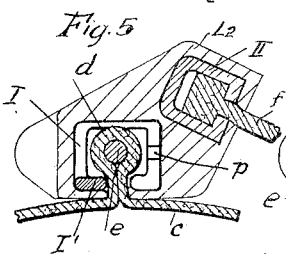 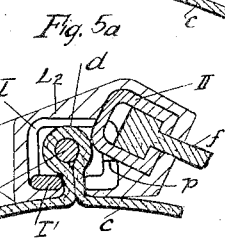 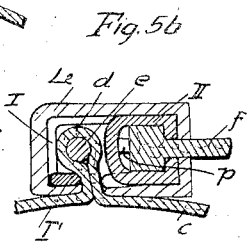
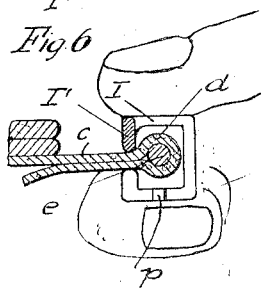 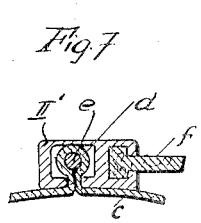 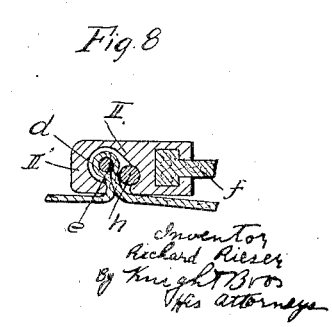
Inventor
Richard Rieser
By Knight Bros
His attorneys Patented Nov. 1, 1938

2,134,892

UNITED STATES PATENT OFFICE 2,134,892

INTERLOCKING FASTENER

Richard Rieser, Vienna, Austria

Application May 8, 1935, Serial No. 20,470
In Austria May 17, 1934

7 Claims. (Cl. 24—205)

This invention relates to interlocking fasteners of the type comprising rows of fastening elements along the edges to be fastened together and a travelling engaging and disengaging member or "rider" for engaging and disengaging the fastener, and has for its main object to provide a fastener of this description for holding together edges requiring to be variably spaced, such as the edges of the upper flaps of shoes. Other features of the invention concern the particular construction and mode of operation of the individual parts and elements of the fastener.

It has not proved satisfactory hitherto to employ interlocking fasteners with a running operating member in connection with shoes and other articles of clothing requiring variability of fit between the parts to be fastened together thereby. The interposition of elastic material has not proved to be satisfactory as a means of overcoming this difficulty.

The interlocking fastener according to the present invention is perfectly satisfactory for use wherever variable fit is required, and more particularly for shoes, articles of clothing, and coverings of all kinds requiring to be fitted closely over bodies of indeterminate size and shape.

Forms of construction embodying the invention, and adapted to serve as a shoe fastener, are shown, by way of example, in the accompanying drawing, in which:

Fig. 1 shows a shoe equipped with a fastener according to the present invention, in a partly closed state.

Figs. 2 and 2a show a form of construction of the fastener in which a row of fastening elements attached to the one upper flap embraces, in the position of closure, an adjustable reinforced folded ridge on the tongue of the shoe which is attached to the other upper flap.

Figs. 3 and 3a show a modified form of construction of the fastener in which a row of fastening elements attached to the one upper flap of the shoe interlocks with a row of fastening elements applied to an adjustable reinforced folded ridge on the tongue of the shoe which is attached to the other upper flap.

Figs. 4, 4a, and 4b are three transverse sections taken through the rider at different points, showing the respective positions of the fastening elements appropriate to these points in the form of construction shown in Figs. 2 and 2a.

Figs. 5, 5a, and 5b are three transverse sections taken through the rider at different points, showing the respective positions of the fastening elements appropriate to these points in the form of construction shown in Figs. 3 and 3a.

Fig. 6 illustrates the manipulation of the one row of fastener elements in the type of fastener shown in Figs. 3 and 3a, for varying the extent to which the parts fastened are drawn together.

Figs. 7 and 8 show further modifications.

Referring to the drawing, the two upper flaps of the shoe are denoted by $a$ and $b$. Beneath these flaps there is formed from the tongue $c$, which is sewn to one of the flaps, a fold $d$ in which there is embedded a flexible rod $e$ forming with the fold $d$ a reinforced folded ridge. The rod-shaped member $e$ is preferably of the same length as the tongue $c$ and detachably secured at its upper end.

To the flap $b$ there is sewn a leather or fabric strip $f$ to which there is secured a row of fastening elements II (Fig. 2) which in use are covered over on top by the flap $b$. The engaging and disengaging of the fastener is effected with the aid of a rider $L_1$ which is of such progressively modified cross-sectional shape (see Figs. 4, 4a, and 4b) that it positively effects the embracing and releasing of the folded ridge $d$ by the pivoted portions II' of the individual fastening elements II. To effect an alteration in fit it is merely necessary to shift the position of the rod-shaped member $e$ relatively to the tongue $c$ of the shoe. The folded ridge itself is formed by the rider in the operation of closing the fastener as shown in Figs. 4, 4a, and 4b.

In the form of construction shown in Figs. 3 and 3a the employment of the folded ridge as an immediate element of the fastener is avoided by the application of a row of counter-fastening elements I to this ridge. The individual fastening elements I are interconnected by a continuous web I' made preferably from flexible material. With this form of construction the operation of the fastener approximates that of the usual type of interlocking fastener with traveling operating member or rider. The engaging and disengaging is effected by means of a rider $L_2$ which is of such cross-sectional shape, as shown in Figs. 5, 5a, and 5b, that it brings the individual elements of the row II into or out of engagement with those of row I, according to the direction in which it is moved. Only in the present case the fastening elements are brought into engagement with each other from the side and not end to end as with the usual type of interlocking fastener. The interengagement between the elements I and II is effected by the lateral projections $p$ on the elements I which engage behind the front portion of the elements II (Fig. 5b). To alter the tightness of fit it is necessary, as shown in Fig. 6, to fold together the two halves of the tongue formed by the folded ridge. It is only in this condition that it is possible to shift or displace the folded ridge together with the row of fastening elements I.

Fig. 7 shows a fastener similar to that shown in Figs. 2 and 2a in which the rod-shaped member e consists of elastic material. In this case very considerably simpler one-piece fastening elements can be used. It is not necessary for the hook-shaped portions II' of the fastening elements II to be capable of pivotal movement, as in Fig. 2, since the core e of the folded ridge becomes suitably deformed by the rider during the operations of closing and opening the fastening.

In the form of construction shown in Fig. 8 there is provided externally of the reinforced folded ridge d a further flexible rod-shaped member h preferably of elastic material which lies close against the side of the ridge d, and which is likewise suitably deformed and displaced by the rider during the operations of engaging and disengaging the fastener. The purpose of this member is to enhance the clamping force of the fastening elements II, more particularly in the position of closure.

The described interlocking fastener, when used in conjunction with shoes, has the advantage in common with shoe-laces of being accurately adaptable to the shape of the foot and of being adjustable to any width of fitting. In addition however, it provides the further advantages of enabling the shoe to be put on and taken off in a fraction of the time required when laces are used, and that with greater ease since the shoe can be opened up for the entire length of the upper flaps. The joint formed is closer and a more effective protection against the penetration of water than when laces are used. Finally, the appearance of the shoe is improved, since the whole of the fastening is normally invisible when the shoe is being worn.

The described fastener is suitable not only for articles of clothing but also for bags and the like, and in general for all purposes requiring frequent readjustment of fit.

I claim:

1. An interlocking fastener for the temporary fastening together of two flexible and variably adjustable parts, comprising in combination a row of spaced fastening elements permanently attached to the outer edge of one of the said parts only, means comprising a rod-shaped reinforcing member for forming a counterfastening ridge on the other of the said parts in any desired position intermediate the longitudinal edges thereof, and a hollow traveling rider of progressively modified inside cross-section adapted to embrace the said fastening elements and ridge jointly and to bring said elements and ridge into and out of interlocking engagement with each other according to the direction in which the said rider is moved.

2. An interlocking fastener for the temporary fastening together of two flexible and variably adjustable parts, comprising in combination a row of fastening elements permanently attached to the outer edge of one of the said parts, a rod-shaped reinforcing member loosely applied to the under side of the other of the said parts, a fold in the said latter part about the said reinforcing member to form an upstanding ridge, pivoted hook-shaped extensions on the said elements, and a travelling rider of progressively modified cross-sectional shape and adapted to engage and bring the said hook-shaped extensions into and out of interlocking engagement with the said ridge according to the direction in which the said rider is moved.

3. An interlocking fastener for the temporary fastening together of two flexible and variably adjustable parts, comprising in combination a row of fastening elements permanently attached to the outer edge of one of the said parts, a rod-shaped reinforcing member adjustably secured to the under side of the other of said parts and adapted to form an upstanding ridge on said other part, pivoted hook-shaped extensions on the said elements, and a travelling rider of progressively modified cross-sectional shape adapted to engage and bring said hook-shaped extensions into and out of interlocking engagement with said ridge according to the direction in which the said rider is moved, said travelling rider being further adapted in the operation causing interlocking engagement to form said ridge over said reinforcing member.

4. An interlocking fastener for the temporary fastening together of two flexible and variably adjustable parts, comprising in combination a row of substantially lug-shaped, spaced, fastening elements permanently attached to the outer edge of one of the said parts, a rod-shaped reinforcing member adapted to be applied to the under side of the other of the said parts to form with material of said part an upstanding ridge dividing said part longitudinally into two flaps, a row of substantially hoop-shaped, correspondingly spaced, counterfastening elements on the second of the said parts, each of the said counterfastening elements embracing the said ridge with a gap between its ends sufficiently large to allow the said reinforcing member and ridge to be shifted transversely of said part when the said flaps are folded together so that they lie parallel to each other, and a hollow traveling rider of progressively modified inside cross-section adapted to embrace and bring the said fastening elements and counterfastening elements into and out of engagement with each other according to the direction in which it is moved.

5. An interlocking fastener as claimed in claim 4, in which the said counterfastening elements are linked together by a continuous common web.

6. An interlocking fastener for the temporary fastening together of two flexible and variably adjustable parts, comprising in combination a row of fastening elements permanently attached to the outer edge of one of the said parts, a rod-shaped reinforcing member made of elastic material loosely applied to the under side of the other of said parts, a fold in said latter part about the reinforcing member to form an upstanding ridge, hook-shaped extensions on the said elements, and a travelling rider of progressively modified cross-sectional shape and adapted to deform said elastic reinforcing member and to bring the hook-shaped extensions into and out of interlocking engagement with said ridge according to the direction in which the said rider is moved.

7. An interlocking fastener as claimed in claim 6 further comprising a second rod-shaped flexible member applied to the outside of the said ridge for the purpose of enhancing the grip of the said fastening elements upon the said ridge.

RICHARD RIESER.